US007058434B2

(12) United States Patent
Wang et al.

(10) Patent No.: US 7,058,434 B2
(45) Date of Patent: Jun. 6, 2006

(54) MOBILE COMMUNICATION

(75) Inventors: Hanyang Wang, Witney (GB); Ming Zheng, Farnborough (GB); Jason Goward, Billingshurst (GB)

(73) Assignee: Nokia Corporation, Espoo (FI)

(*) Notice: Subject to any disclaimer, the term of this patent is extended or adjusted under 35 U.S.C. 154(b) by 206 days.

(21) Appl. No.: 10/716,050

(22) Filed: Nov. 18, 2003

(65) Prior Publication Data

US 2004/0121828 A1 Jun. 24, 2004

(30) Foreign Application Priority Data

Dec. 19, 2002 (GB) ................................ 0229616.8

(51) Int. Cl.
*H04M 1/00* (2006.01)

(52) U.S. Cl. .............................. 455/575.7; 455/562.1; 455/78; 455/552.1; 343/702

(58) Field of Classification Search ............ 455/562.1, 455/575.7, 101, 277.1, 552.1, 168.1, 78; 343/853, 702, 846, 727
See application file for complete search history.

(56) References Cited

U.S. PATENT DOCUMENTS

| | | | | |
|---|---|---|---|---|
| 4,641,366 | A * | 2/1987 | Yokoyama et al. | 455/73 |
| 5,313,218 | A * | 5/1994 | Busking | 343/727 |
| 5,317,293 | A * | 5/1994 | Bacon et al. | 333/258 |
| 6,034,636 | A * | 3/2000 | Saitoh | 343/846 |
| 6,229,485 | B1 * | 5/2001 | Ito et al. | 343/846 |
| 6,456,248 | B1 * | 9/2002 | Ito | 343/702 |
| 6,624,789 | B1 * | 9/2003 | Kangasvieri et al. | 343/702 |
| 6,753,815 | B1 * | 6/2004 | Okubora et al. | 343/702 |
| 6,894,650 | B1 * | 5/2005 | Darden et al. | 343/702 |
| 2001/0054979 | A1 | 12/2001 | Bahr et al. | 343/700 |
| 2002/0002037 | A1 * | 1/2002 | Ito et al. | 455/101 |
| 2002/0117543 | A1 * | 8/2002 | Kocznar et al. | 235/380 |
| 2005/0107043 | A1 * | 5/2005 | Avasarala et al. | 455/78 |

FOREIGN PATENT DOCUMENTS

| | | | |
|---|---|---|---|
| EP | 0680161 | A1 | 11/1995 |
| GB | 2316540 | A | 2/1998 |
| GB | 2 349 982 | A | 11/2000 |
| GB | 2371924 | A | 8/2002 |
| JP | 5-284060 | | 10/1993 |

* cited by examiner

*Primary Examiner*—Joseph Feild
*Assistant Examiner*—Kamran Afshar
(74) *Attorney, Agent, or Firm*—Harrington & Smith, LLP

(57) ABSTRACT

An antenna arrangement for dual mode radio devices such as WCDMA/GSM or Bluetooth radio devices. The arrangement contains two antennas close to each other, where a shorting switch is used at an open end of one antenna to increase isolation by effectively converting the one antenna from a quarter wave length antenna to a half wave length antenna when not needed in order to improve the efficiency of the other antenna. The shorting switch is typically a MEMS switch and the antennas are typically PIFA antennas. A radio device containing the arrangement has also been disclosed.

23 Claims, 3 Drawing Sheets

MOBILE COMMUNICATION

FIELD OF THE INVENTION

This invention relates to mobile communication. The invention relates particularly, but not exclusively, to reduction of coupling between different antennas in one portable radio device.

BACKGROUND OF THE INVENTION

Mobile telephones have drastically developed during past decade so that in the near future, the most developed ones will provide 2 G, 3 G and Low Power Radio Frequency (LPRF) radio communications all in the same portable device. Typically, these devices are designed to be hand held, but other form factors such as wristwatch type and wearable devices may also emerge. Common to them all, the number of antennas needed in a single device is likely to grow to two or three.

An antenna radiates electromagnetic waves with a power that is a function of its electric feed signal's power and frequency. An antenna has a resonant frequency at which it has the highest gain, which is radiation power. The highest gain not only affects the transmission efficiency but also the reception efficiency so that an antenna is also most sensitive to receive radio signals at its resonant frequency or frequencies. Hence, an antenna absorbs radio signals best at its resonant frequency.

With two or more different antennas used for different radio communications such as 3 G (Wide Band CDMA or W-CDMA) and PCS (GSM1900), for instance, the frequency bands on which these antennas operate are very close to each other or overlap, because many new radio standards share the frequency bands around 1.8–2.4 GHz region. The antennas are bound to reside close to each other if the entire apparatus housing them is small, perhaps a few centimetres in maximum dimension, and hence the coupling between the antennas is also bound to increase.

Coupling of antennas means that a portion of the radio signals transmitted by one antenna are captured by another antenna. The higher the coupling, the smaller the proportion of the transmitted radio power that actually leaves the radio device and reaches a receiver so that the transmission power will need to be boosted to ensure a reliable radio link. This naturally consumes power, causes possibly inconvenient amounts of heat dissipation and also may harm the circuitry connected to the other antenna that unintentionally captures the radio signals. It is thus necessary to ensure a sufficient level of isolation to provide satisfactory efficiency for the transmissions.

It should be appreciated that the coupling not only takes place when two different antennas are used in proximity to each other, but the mere existence of the second antenna will draw some radio power. The radio power draw is the stronger the closer the antennas are together and the closer their resonant frequencies. The isolation has often been enhanced by locating different antennas as far from each other as possible, by using different polarisations, by manually removing an unused antenna from the device for periods when the unused antenna is not needed, by placing radiation obstacles between the antennas and by disconnecting the ground or feed of unused antennas.

Due to portability requirements, the size of the radio device should be kept to a bare minimum and hence the size of printed circuit board on which the antennas typically are laid is also often too small for providing adequate isolation without dedicated measures to improve isolation.

SUMMARY OF THE INVENTION

According to a first aspect of the invention there is provided an antenna for a radio device, comprising:

a radiating body having a first end and a second end, the second end being operable as an open end;

a feed point between the first end and the second end; and a detuning switch for grounding the radiating body at a particular point between the feed point and the second end such that the power draw caused by the antenna to other antennas is reduced.

Advantageously, the detuning switch residing between the feed point and the second end of the antenna results in the switch being opened when the antenna is in use. This may result in causing less attenuation in the antenna's transmission gain than a detuning switch at the grounding or feed point would cause.

The first end may comprise a grounding point. Advantageously, the grounding of the first end causes the antenna to operate as a ¼ wave length antenna when the detuning switch is open.

The detuning switch may reside closer to the second end than to the feed point. The distance between the detuning switch and the second end may be less than or equal to the distance between the first end and the feed point. The detuning switch may have been configured to ground the radiating body from the second end.

Advantageously, locating the shorting switch close to the second end of the antenna provides a high isolation as the second resonant band becomes the more spaced apart from the first resonant band the closer the shorting switch is to the second end. Even more advantageously, if the first end has been grounded, the tuning switch may alternate the antenna substantially between the form of a ¼ wave length antenna and approximately ½ wave length antenna thus providing a great level of isolation. Consecutively to operating the antenna substantially as a quarter wave length antenna, the radiating body can be relatively small.

It should be appreciated that even though the resonant frequency of an antenna turned from a ¼ wave length antenna to substantially ½ wave length antenna may still be close to the upper harmonic frequency of another antenna, the absorption of the upper harmonic frequency of other antennas would not impair the transmission of the base frequencies of other antennas.

The distances may refer to the electric distance over which electric signals travel when proceeding in the radiating body.

The antenna may be open ended from both the first and second end when in use and the tuning switch has been configured to ground the antenna from a particular point between the feed and the second end when the antenna is idle. In this case, the first end may have no grounding point.

Advantageously, the selective single-end grounding when idle causes the antenna to substantially turn from a ½ wave length antenna to a ¼ wave length antenna when the antenna becomes idle. This embodiment has the advantage that whilst the radiating body needs to be longer than is the case when using the antenna as a ¼ wave length antenna, the radiation pattern can be very even particularly if a dipole antenna construction is employed.

The antenna may be a multi-band antenna. Advantageously, the isolation can be improved also for a common antenna used for two or more bands having one or more operation frequency bands near that of another antenna near which the antenna should operate.

The antenna may be an inverted F-shaped antenna (IFA). The antenna may be a Planar Inverted F-Antenna (PIFA). Advantageously, the IFA and PIFA antennas provide a relatively small size by operating as a ¼ wave length antenna. A PIFA antenna also has a good bandwidth in comparison with other planar antennas such as a patch antenna with ½ wave length.

The tuning switch may comprise a switching pin at a radiation edge of the antenna. Advantageously, the tuning switch comprising a switching pin at the radiation edge effectively improves isolation as then the antenna will be substantially converted from a quarter wave length antenna to a half wave length antenna by closing the shorting switch and grounding the open end of the antenna.

The tuning switch may comprise a low insertion loss switch such as a MicroElectroMechanical System (MEMS) switch that has much less insertion loss than a conventional switch.

The antenna may have been configured to provide a first radio interface selected from a group of: Wideband CDMA, GSM, PCN, PDC, IS-136, CDMA 2000, IS-95, NMT, AMPS, TETRA, wireless LAN, Bluetooth.

Whilst the invention is not limited to terrestrial radio access use, it has strong applications in handheld devices that typically transmit to terrestrial base or mobile stations.

According to a second aspect of the invention there is provided an antenna arrangement comprising a first antenna and a second antenna, whereby the first antenna is operable on a first frequency band and the second antenna is operable on a second frequency band such that the second antenna can draw transmission power from the first antenna, the second antenna comprising:

- a radiating body having a first end and a second end, the second end being operable as an open end; and
- a feed point between the first end and the second end; the antenna arrangement further comprising:
- a detuning switch for grounding the radiating body at a particular point between the feed point and the second end.

Advantageously, the antenna arrangement allows detuning of the second antenna so that the draw of transmission power from the first antenna can be reduced.

The arrangement may comprise at least three antennas.

Two of the antennas may be designed for use with different telecommunications networks and at least one antenna is designed for Low Power Radio Frequency (LPRF) communications with short range transceivers such as Bluetooth accessories or Wireless LAN access points.

According to a third aspect of the invention there is provided a radio device comprising the antenna arrangement of the second aspect of the invention.

The radio device may be capable of making mobile phone calls.

The radio device may be a portable radio device. The radio device may be a hand held device, of a wristwatch type, or a wearable device, for example, integrated with human clothing. The radio device may be a fixed radio station such as a base transceiver station.

In a small device antennas are disposed closely together and isolation is likely to be more of a problem than in large devices. Therefore, the invention has particular utility in small devices Advantageously, the radio device can be manufactured into a small size without excessively compromising power efficiency by reducing transmission power losses via increased isolation.

According to a fourth aspect of the invention there is provided a method of improving antenna isolation in a system comprising a first antenna and a second antenna, wherein the second antenna can be idle whilst the first antenna operates, wherein the second antenna comprises a radiating body having a first end and second end and a feed point between the first end and the second end, the method comprising the steps of:

- detuning the second antenna when idle by grounding the radiating body between the feed point and the second end; and
- terminating the grounding for the second antenna to be used.

The steps of grounding and terminating the grounding may take place automatically depending on whether the isolation need to be improved and/or the antenna is needed for transmission and/or reception of radio signals.

According to a fifth aspect of the invention there is provided a controller for a system comprising a first antenna and a second antenna where the second antenna can be idle and draw power from the first antenna whilst the first antenna operates, wherein the second antenna comprises a radiating body having a first end and second end and a feed point between the first end and the second end, whereby the radiating body has been configured to be alternatively grounded and not grounded at a particular point between the feed point and the second end of the radiating body, the controller comprising means for causing the grounding when the second antenna is idle to detune the second antenna and not to detune the second antenna when the second antenna is in use.

The controller may consist of hardware such as a processor instructed to ground the second end on-demand. Alternatively, the controller may consist of computer executable instructions executable by a hardware unit capable of operating the grounding of the second end. The controller may consist of a combination of software and hardware.

It should be appreciated that the embodiments of any one aspect may produce corresponding advantages when combined with different other aspects as well and that they can be combined where applicable, even though not all embodiments are expressly written after all aspects.

BRIEF DESCRIPTION OF THE DRAWINGS

The invention will now be described, by way of example only, with reference to the accompanying drawings, in which.

DETAILED DESCRIPTION

Figure 1:
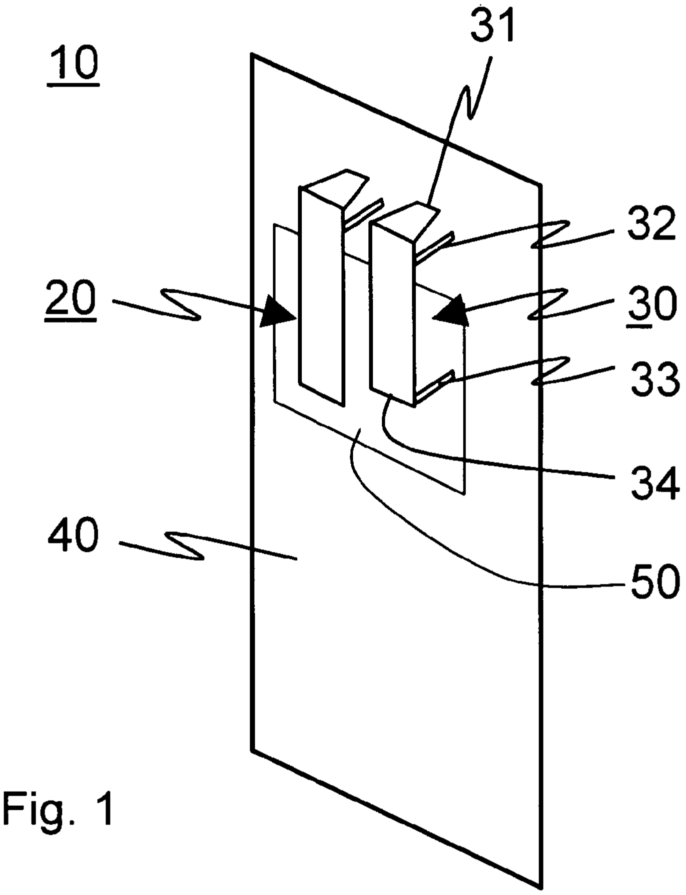
FIG. 1 shows a schematic drawing of an antenna arrangement according to a preferred embodiment.

FIG. 1 shows a schematic drawing of an antenna arrangement 10 according to a preferred embodiment. The antenna arrangement 10 comprises a first PIFA antenna 20 and a second PIFA antenna 30 fixed to a circuit board 40. The second PIFA antenna comprises an elongated radiator 31 which is a substantially flat band that is connected in its first end to the circuit board 40 in a normal to the plane of the circuit board 40 and bent so that for most of its length the radiator 31 is parallel with the circuit board 40. The circuit board conducts feed signals to the antennas 20 and 30 and also forms a ground plane 50 for them. The arrangement 10 comprises a signal feed to the radiator 31 near the first end, connected to the part of the radiator that is substantially parallel with the circuit board 40. At its extreme end opposite to the first end, the radiator has a second end 34. A detuning switch or shorting switch 33, here illustrated as a shorting pin, is positioned at the second end 34 so that when open, it causes the second PIFA antenna 30 to operate as an open ended PIFA antenna and when closed, it causes the second PIFA antenna 30 to operate as a close ended PIFA antenna.

The dimensions of the first PIFA antenna 20 are 7 mm×28 mm, the dimensions of the second PIFA antenna 30 are 7 mm×24 mm, and both antennas have a height or 7 mm. The dielectric constant and the thickness of their substrate are 4.2 and 1.5 mm, and the dimensions of the circuit board are 45 mm×100 mm. The substrate is a material layer on which the antenna metal track is accommodated.

The shorting switch 33 preferably comprises a low insertion loss MicroElectroMechanical System (MEMS) switch that is used as an actuator to short and unshort the second antenna to the ground plane 50. The switch can be fabricated by using silicon micromachined technology. This technology has also been used to produce other components, such as waveguide, cavities, filters and antennas. The advantage of using this technology is low loss in comparison with conventional one, especially at higher frequency. Typically, the insertion loss for a MEMS switch is only around 0.1–0.2 dB as opposed to at least 0.5 dB provided by conventional switches.

Figure 2:
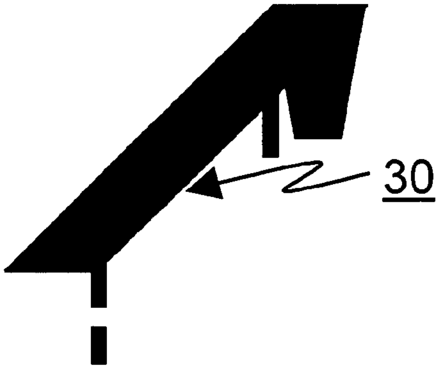
FIG. 2 shows a schematic drawing of the second PIFA antenna 30 of FIG. 1 in an open configuration.
Figure 3:
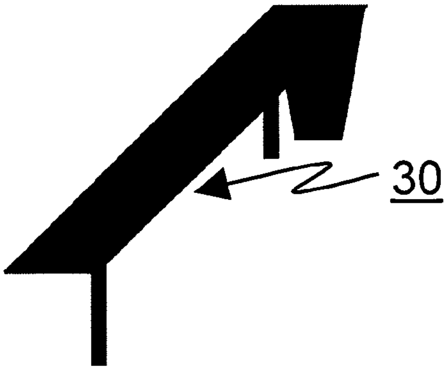
FIG. 3 shows a schematic drawing of the second PIFA antenna 30 of FIG. 1 in a closed configuration.

As illustrated in FIG. 2, while the antenna is operating, the switch is off and the switching pin is an open circuit. The open circuit behaves as a capacitor, which has been used in many antenna designs for the purpose of reducing antenna's volume. On the other hand, if the antenna is at the idle state, as illustrated in FIG. 3, the switch is on and the switching pin is a short circuit. The resonant frequency of the antenna at this state is generally 1.5–2.0 time that of the antenna at the operating state, because the resonant frequency of an antenna with two shorting pins at its two ends are not one-quarter wavelength resonator, but a half wavelength resonator. As the resonant frequency of the switching antenna is far away from its original resonance, excellent isolation, between the switching antenna and the antennas whose resonant frequency is very close to the original resonant frequency of the switching antenna, can be achieved.

Simulated isolation results are shown in Table I, with and without the switching pin, for the two PIFA antennas 20 and 30 shown in FIG. 1. The resonate frequencies of the two PIFA antennas 20 and 30 are 1.72 GHz and 1.92 GHz, respectively. The resonant frequency of the second antenna 30 at the idle state is around 3.2 GHz. As shown in Table 1, more than 10 and up to 15-dB isolation can be achieved even when the two antennas are very close to each other (only 4 mm apart).

TABLE 1

Comparison of isolation with and without a switching pin

| distance | Isolation (dB) | |
|---|---|---|
| between antennas (mm) | without switching pin | With switching pin |
| 4 | 6.2 | 15 |
| 10 | 9.5 | 21 |
| 16 | 11.5 | 25 |

Basically, when the second antenna 30 is operating, that is transmitting or receiving, the shorting pin 33 is an open circuit and hence the insertion loss it causes is very small. A pin at the open end of an antenna has a capacitor-loaded effect that reduces the antenna's volume for a given frequency although it also slightly degrades the antenna's bandwidth. When the second antenna 30 is in an idle state, the shorting pin 33 is switched on and shorted with the ground plane 50. The resonant frequency of the second antenna 30 is then much higher than its original resonant frequency and hence good isolation can be achieved. In summary, the invention thus provides a low insertion loss, with a high isolation and with relatively small antenna volume. The operation bandwidth of the second antenna 30 will be slightly narrowed by the capacitor-load effect.

Figure 4:
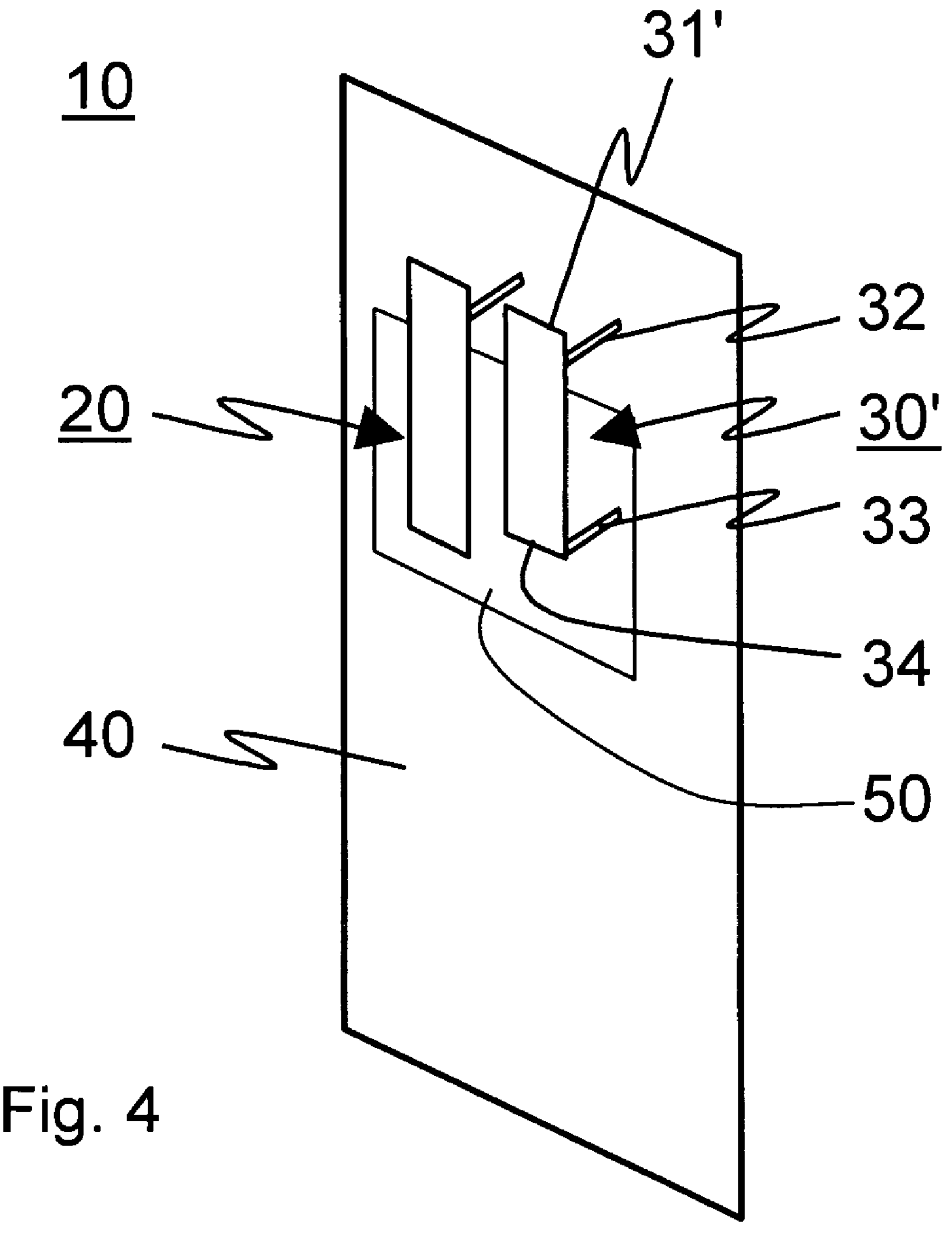
FIG. 4 shows a schematic drawing of an antenna arrangement according to an alternative embodiment.

FIG. 4 shows a schematic drawing of an antenna arrangement according to an alternative embodiment, wherein an antenna 30' is provided with two open ends 31' and 32 and the detuning switch 33 substantially at one of the two open ends 34. The antenna 30' has been designed for use with the detuning switch 33 in the open configuration so that when detuning is needed, the detuning switch 33 causes the antenna 30' become grounded from a single end 34. The antenna 30' will thus normally operate in a half wave-length mode and hence its resonant frequency band will decrease as the antenna becomes substantially quarter a wave-length antenna in the idle mode that is when detuning is applied. As in the preferred embodiment, albeit converting the modes of the antenna 30' in an opposite direction compared to that of preferred antenna 30, the detuning switch 33 is only conductive when the antenna 30' is idle mode and hence adds a negligent insertion loss to the antenna 30' when the antenna 30' is fed with current for transmitting and when the antenna 30' is used to receive radio signals.

Figure 5:
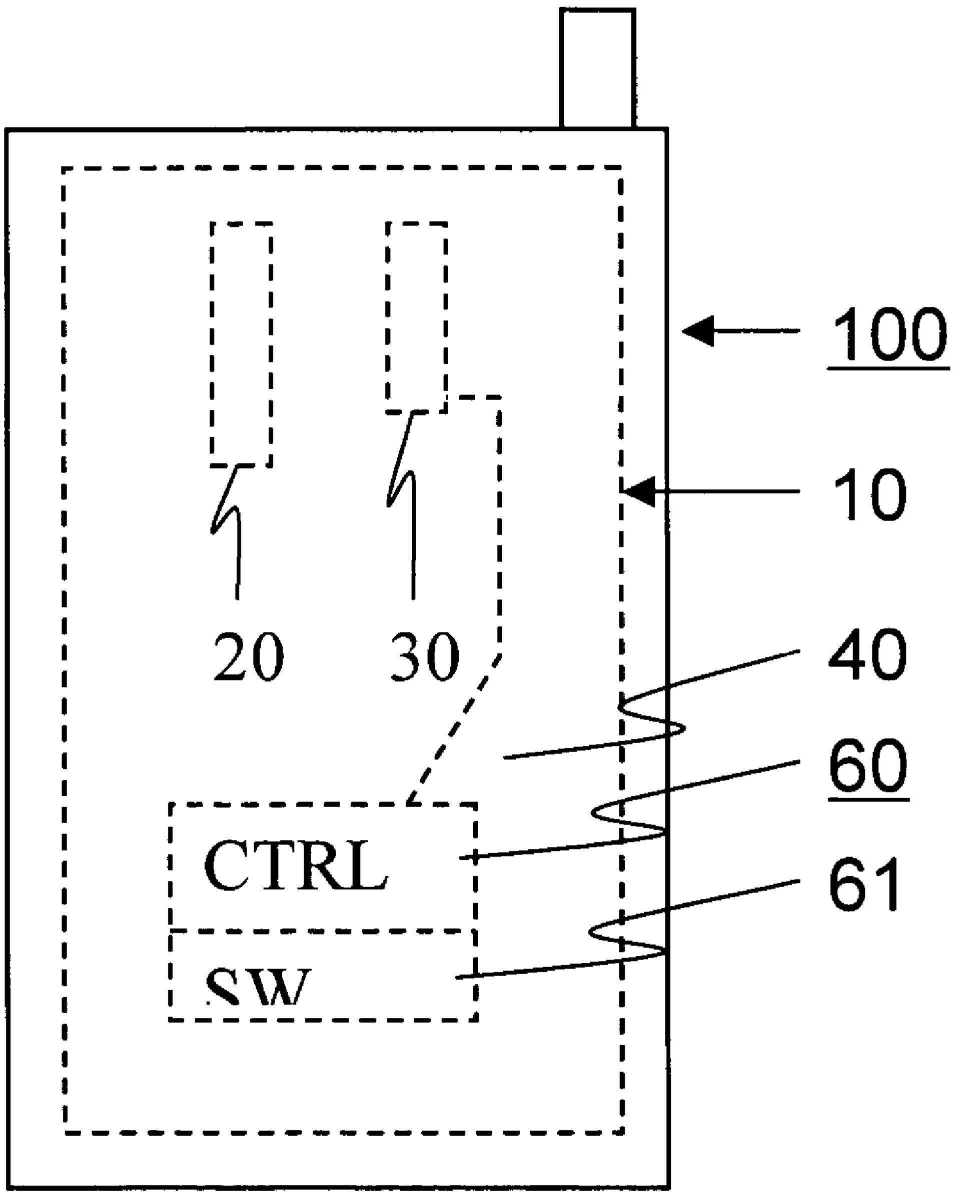
FIG. 5 shows a schematic drawing of a mobile telephone comprising the antenna arrangement of FIG. 1.

FIG. 5 shows a schematic drawing of a mobile telephone 100 comprising the antenna arrangement of FIG. 1. The mobile telephone 100 comprises the circuit board 10 with the first and second antennas 20 and 30. Additionally, the mobile telephone comprises a controller 60 for controlling the second antenna 30. The controller comprises a controlling circuitry, such as a Digital Signal Processor DSP, an Application-Specific Integrated Circuit ASIC or the like. The circuitry is typically controlled by a set of instructions or computer program code stored in a memory 61.

Preferably both in the preferred and the alternative embodiment, the location of the detuning switch has been selected so that in the substantially half a wave length mode the effective length of the antenna is 70 to 95, even more preferably 80 to 90 percent of the half wave length.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The present invention includes any novel feature or combination of features disclosed herein either explicitly or any generalisation thereof irrespective of whether or not it relates to the claimed invention or mitigates any or all of the problems addressed.

The invention claimed is:

1. An antenna arrangement for a radio device, comprising:

first and second antennas, whereby the first antenna operates on a first frequency band and the second antenna operates on a second frequency band, the second antenna drawing transmission power from the first antenna when the first antenna transmits radio signals on the first frequency band, the second antenna comprising a radiating body having a first end and a second end, the second end selectively operating as an open end;

a feed point between the first end and the second end; and a detuning switch for grounding the radiating body at a point between the feed point and the second end such that the power draw caused by the second antenna from the first antenna is reduced, the radiating body being disposed over a ground plane such that the second end overlies the ground plane and the first end does not overlie the ground plane.

2. An antenna arrangement according to claim 1, wherein the detuning switch selectively grounds the radiating body from substantially the second end.

3. An antenna arrangement according to claim 1, wherein the first end comprises a grounding point.

4. An antenna arrangement according to claim 1, wherein the second antenna selectively operates substantially as a quarter wave length antenna when in use.

5. An antenna arrangement according to claim 1, wherein the first end is open-ended when to many operating.

6. An antenna arrangement according to claim 1, wherein the second antenna selectively operates substantially as a half wave length antenna when in use.

7. An antenna arrangement according to claim 1, wherein the second antenna is a multi-band antenna.

8. An antenna arrangement according to claim 1, wherein the second antenna is a Planar Inverted F-Antenna.

9. An antenna arrangement according to claim 1, wherein the tuning switch comprises a low insertion loss switch.

10. An antenna according to claim 1, wherein the radiating body is a substantially flat band that is substantially parallel to the ground plane and bent at the first end to provide an elongated radiator.

11. An antenna arrangement comprising a first antenna and a second antenna, whereby the first antenna operates on a first frequency band and the second antenna operates on a second frequency band and thereby the second antenna draws transmission power from the first antenna when the first antenna transmits radio signals in the first frequency band, the second antenna comprising:

a radiating body having a first end and a second end, the second end selectively operating as an open end; and a feed point between the first end and the second end; the antenna arrangement further comprising:

a detuning switch for grounding the radiating body at a point between the feed point and the second end in order to reduce said power draw.

12. An antenna arrangement according to claim 11, wherein the detuning switch selectively grounds the radiating body from substantially the second end.

13. An antenna arrangement according to claim 11, wherein the first end comprises a grounding point.

14. An antenna arrangement according to claim 11, wherein the second antenna selectively operates substantially as a quarter wave length antenna when in use.

15. An antenna arrangement according to claim 11, wherein the first end is open-ended when operating.

16. An antenna according to claim 11, wherein the antenna selectively operates substantially as a half wave length antenna when in use.

17. An antenna arrangement according to claim 11, further comprising a ground plane, wherein the radiating body of the second antenna is a substantially flat band that is substantially parallel to the ground plane and bent at said first end to provide an elongated radiator, wherein the first end protrudes beyond the ground plane.

18. An antenna arrangement according to claim 17, wherein the first and second antennas are physically separate.

19. A radio device comprising a first antenna and a second antenna, whereby the first antenna operates on a first frequency band and the second antenna operates on a second frequency band, the second antenna drawing transmission power from the first antenna when the first antenna transmits radio signals on the first frequency band, the second antenna comprising:

a radiating body having a first end and a second end, the second end selectively operating as an open end; and a feed point between the first end and the second end; the radio device further comprising:

a detuning switch for grounding the radiating body at point between the feed point and the second end in order to reduce said power draw.

20. A radio device according to claim 19, wherein the radio device is a portable radio device.

21. A method of improving antenna isolation in a system comprising a first antenna and a second antenna, whereby the first antenna operates on a first frequency band and the second antenna operates on a second frequency band, the second antenna drawing transmission power from the first antenna when the first antenna transmits radio signals on the first frequency band, wherein the second antenna comprises a radiating body having a first end and second end a feed point between the first end and the second end, the method comprising the steps of:

detuning the second antenna when idle by grounding the radiating body between the feed point and the second end; and not grounding the radiating body of the second antenna between the feed point and the second end when the second antenna is to be used.

22. A method according to claim 21, wherein the steps of grounding and terminating the grounding take place automatically.

23. A controller for a system comprising a first antenna and a second antenna, whereby the first antenna operates on a first frequency band and the second antenna operates on a second frequency band, the second antenna drawing transmission power from the first antenna when the first antenna transmits radio signals on the first frequency band, wherein the second antenna comprises a radiating body having a first end and second end and a feed point between the first end and the second end, whereby the radiating body selectively grounds a point between the feed point and the second end of the radiating body, the controller comprising means for causing the grounding when the second antenna is idle to detune the second antenna and not to detune the second antenna when the second antenna is in use.

* * * * *